UNITED STATES PATENT OFFICE.

JOACHIM BARON VON ROSÉ, OF BRESLAU, GERMANY.

MANUFACTURE OF BEER.

SPECIFICATION forming part of Letters Patent No. 315,980, dated April 14, 1885.

Application filed February 10, 1885. (No specimens.)

*To all whom it may concern:*

Be it known that I, JOACHIM BARON VON ROSÉ, engineer and chemist, a subject of the Emperor of Germany, and a resident of Breslau, Germany, and now temporarily residing in the city of Chicago, county of Cook, and State of Illinois, have invented certain new and useful Improvements in the Manufacture of Beer, of which the following is a specification.

In the ordinary process of making beer it is customary at some stage of the proceeding to introduce the malt, which has been previously dried and crushed, ground, or bruised, and to then complete the operations necessary to perfect the beer. This crushed, ground, or bruised malt has been treated in various ways, and mixed with many and various other materials at different stages of the process of beer-making, all of which is well known to those skilled in the art.

I have found that many advantages may be secured by introducing the malt in the form of the whole grain of the freshly-prepared so-called "green malt;" and my present invention consists in that improvement in the art of beer-making which consists in the introduction of the whole freshly-prepared green malt, in contradistinction to dried, crushed, bruised, or ground malt, into the mixture from which the beer is made.

In carrying out my improvement I do not wish to be limited to any particular process of beer-making, nor to any particular species of malt, as I have found my invention is applicable to any of the well-known and usual methods of manipulation, as well as to various kinds of malt.

In order to enable others to practice my invention, I will say, briefly, that it consists, broadly, in the substitution of the whole-grain freshly-prepared green malt for the usual dried and crushed or bruised malt, which is introduced into the materials from which beer is made at any time. However, I preferably prepare the malt for use in a vessel separate from the unmalted grains or materials, and I do this in practice by subjecting a quantity of whole fresh-made green malt to water at a temperature of about 100° Fahrenheit for about one hour in a hermetically-closed vessel. It is then cooked for about one and a half hour by gradually increasing the heat to about thirty pounds pressure. It is then preferably removed to another vessel and kept in a reducing temperature of about 170° Fahrenheit for an hour, to allow the sediment or impurities to settle, during which time additional saccharine matter may be added, if desired, when the clear liquid is transferred to another vessel for the purpose of boiling with the hops, after which it is quickly cooled in the usual manner and filled into tanks, in which the proper yeast is added for producing fermentation in the ordinary way.

The result of this improvement I find to be a beer having a clear, palatable, and durable quality. As it will keep much longer than beer made from dry, crushed malt, and as I am enabled to save much of the saccharine matter of the malt that is lost in drying and crushing, as well as save the time and expense of machinery for crushing, I am enabled to produce beer of a fine quality at a reduced expense.

In the above specification I have used the term "malt" in its generic sense, and intend to include not only barley malt, but that obtained from any kind of grain or seed like wheat, corn, or any farinaceous fruit—as beans, horse-beans, and the like.

I am aware that green malt has been used in making beer and that it has been suggested, in describing a specific process, that the grinding or crushing of the malt is not absolutely required; but I am not aware that the whole green malt has ever been used or its use even suggested prior to my invention.

Having thus fully set forth my invention and one way of carrying out the same, what I claim, and desire to secure by Letter Patent, is—

That improvement in the art of beer-making which consists in introducing into the mixture from which the beer is to be made, the whole freshly-prepared green malt, in contradistinction to the usual dry, crushed malt, substantially as described.

In testimony whereof I have signed my name to this specification in the presence of two subscribing witnesses.

JOACHIM BARON VON ROSÉ.

Witnesses:
A. M. KLOOREWSKY,
F. L. FREEMAN.